US008590502B2

(12) United States Patent
Krogmann et al.

(10) Patent No.: US 8,590,502 B2
(45) Date of Patent: Nov. 26, 2013

(54) METHOD FOR THE PRODUCTION OF A CYLINDER CRANKCASE HAVING MULTIPLE CYLINDER LINERS AND SHORT CYLINDER LINER WITH A MATERIAL STRIP AFFIXED THERETO

(75) Inventors: Dirk Krogmann, Essen (DE); Bernd Commandeur, Wülfrath (DE); Udo Kempken, Moers (DE); Achim Petry, Hattingen (DE)

(73) Assignee: Peak Werkstoff GmbH, Velbert (DE)

( * ) Notice: Subject to any disclaimer, the term of this patent is extended or adjusted under 35 U.S.C. 154(b) by 572 days.

(21) Appl. No.: 12/504,509

(22) Filed: Jul. 16, 2009

(65) Prior Publication Data

US 2009/0320783 A1 Dec. 31, 2009

(30) Foreign Application Priority Data

Jan. 16, 2007 (DE) ........................ 10 2007 003 135

(51) Int. Cl.
*B62D 15/02* (2006.01)
*F02F 7/00* (2006.01)
*F02F 1/00* (2006.01)

(52) U.S. Cl.
USPC ...................................................... 123/193.2

(58) Field of Classification Search
USPC .................................. 123/193.1–193.5, 668
See application file for complete search history.

(56) References Cited

U.S. PATENT DOCUMENTS

| | | | | |
|---|---|---|---|---|
| 3,315,573 | A * | 4/1967 | de Coye de Castelet | 92/171.1 |
| 4,921,734 | A * | 5/1990 | Thorpe et al. | 428/34.4 |
| 6,030,577 | A | 2/2000 | Commandeur et al. | |
| 6,086,819 | A | 7/2000 | Commandeur et al. | |
| 6,145,488 | A * | 11/2000 | Plechner | 123/193.1 |
| 6,283,081 | B1 * | 9/2001 | Ozeki | 123/193.2 |
| 6,367,463 | B1 * | 4/2002 | Nurmi | 123/668 |
| 6,485,681 | B1 | 11/2002 | Commandeur et al. | |
| 6,487,999 | B2 * | 12/2002 | Ha | 123/193.2 |
| 6,557,513 | B1 * | 5/2003 | Hill et al. | 123/193.2 |
| 6,615,901 | B2 | 9/2003 | Kaminski et al. | |
| 6,769,474 | B2 * | 8/2004 | Engels et al. | 164/312 |
| 7,240,608 | B2 | 7/2007 | Schaefer et al. | |
| 2005/0061285 | A1 * | 3/2005 | Rueckert et al. | 123/193.2 |
| 2005/0279296 | A1 * | 12/2005 | Coney et al. | 123/41.84 |

FOREIGN PATENT DOCUMENTS

| | | | |
|---|---|---|---|
| JP | 53082911 | A | 7/1978 |
| JP | 61028740 | * | 2/1986 |
| JP | 04157057 | A | 5/1992 |
| JP | 04351260 | A | 12/1992 |
| JP | 06185401 | A | 7/1994 |
| JP | 08150463 | A | 6/1996 |
| JP | 2009 115029 | * | 11/2007 |

* cited by examiner

*Primary Examiner* — M. McMahon
(74) *Attorney, Agent, or Firm* — Eschweiler & Associates, LLC

(57) ABSTRACT

A cylinder liner for use in a cylinder crankcase includes a liner body having at least one end face, and a material strip. The material strip is affixed to the liner body and projects axially from the at least one end face of the liner body.

20 Claims, 3 Drawing Sheets

METHOD FOR THE PRODUCTION OF A CYLINDER CRANKCASE HAVING MULTIPLE CYLINDER LINERS AND SHORT CYLINDER LINER WITH A MATERIAL STRIP AFFIXED THERETO

REFERENCE TO RELATED APPLICATIONS

This application is a continuation of PCT/DE2008/000023, filed Jan. 10, 2008 which was not published in English, that claims the benefit of the priority date of German Patent Application No. DE 10 2007 003 135.3, filed on Jan. 16, 2007, the contents of which both are herein incorporated by reference in their entireties.

FIELD OF THE INVENTION

The invention relates to a method for the production of a cylinder crankcase having multiple cylinder liners. The invention further relates to a cylinder liner with a material strip affixed thereto.

BACKGROUND OF THE INVENTION

A common method for the production of a cylinder crankcase for internal combustion engines is to cast cylinder liners, which are composed of an especially resistant material and have suitable tribological characteristics, into the cylinder crankcase. These cylinder liners usually extend over the entire length of the cylinder bore.

DE 101 53 720 C2 shows a cylinder crankcase having a short cylinder liner, which extend substantially between the top and bottom dead centers of the piston travel, and a method for the production of such a cylinder crankcase. To produce the cylinder crankcase, use is made of a mold with sleeves, the short cylinder liners being pushed onto the sleeves before casting of the cylinder crankcase and secured by a projection firmly connected to the sleeve. The sleeve and the cylinder liner are positioned in the mold by slides. The cylinder liners themselves differ from the conventional cylinder liners in having a shorter axial extent. One disadvantage to this method is that the cylinder liner pushed on to the sleeve and secured by a projection of the sleeve can tilt during the movement performed by the slide. Since the cylinder liner is a rigid body, this can result in damage to the mold. In addition, the cylinder liner does not completely cover the sleeve, so that during the casting process contact occurs between the hot casting material and the sleeve. This leads to increased wearing of the sleeve.

DE 102 38 873 B4 shows a cylinder liner for a cylinder crankcase which has contouring on its crankshaft-side end face. During the casting process for the production of a cylinder crankcase the cylinder liner is secured on a sleeve and is supported with the contoured end face against the sleeve. The closed, non-contoured part of the area of the cylinder liner extends between the cylinder head-side end of the cylinder liner and the bottom dead center of the bottom piston ring during the piston travel. On its contoured end face, the cylinder liner positioned on a sleeve is supported by the sleeve only on the very highest elevations of the contour. This makes it more difficult to achieve a correct alignment of the cylinder liner axis parallel to the running direction of the cylinder and is conducive to tipping of the cylinder liner. The sleeve is moreover unprotected against contact with the casting material on those areas which, due to the contouring, are not covered by the cylinder liner.

JP 06 185 401 A shows a cylinder crankcase having a short liner. The axial extent of the liner is in this case dimensioned so that it extends only over the length of the piston rings, when the piston is situated at the top dead center of its travel.

DE 101 53 721 B4 shows a casting tool for the production of a cylinder crankcase, a cylinder liner being cast into the cylinder crankcase. The cylinder liner does not extend over the entire length of the cylinder bore, but during the production process is separated by means of a spacer ring at its cylinder head-side end from an upper wall of the mold. In the cylinder crankcase thus produced, the cylinder liner is anchored and secured by the casting material at its cylinder head-side end. The disadvantages to this are that the spacer ring has to be positioned with great precision, in order to adhere to predefined tolerances, and the fact that the spacer ring has to be removed again in a subsequent operation.

EP 0 871 791 B1 describes a method for the production of thin-walled tubes from a spray-compacted AlSi alloy, which is also particularly suited to the production of cylinder liners, since the manufactured tubes have the required characteristics for cylinder liners in terms of wear resistance, heat resistance and the reduction of pollutant emissions.

EP 0 858 517 B1 describes a method for the production of liners from a hypereutectic AlSi alloy through spray-compacting.

EP 0 848 760 B1 describes another method for the production of cylinder liners from a spray-compacted, hypereutectic AlSi alloy.

DE 102 25 657 B4 describes a mold assembly for the production of cast aluminum engine blocks, which comprise a plurality of cylinder liners. The mold assembly comprises a plurality of mold cores, a cylinder jacket core with multiple cylinder jackets, each having an outside diameter tapering over their axial extent, in particular being used for positioning the cylinder liners. The cylinder liners each have a tapering inside diameter, which is matched to the tapering outside diameter and which is a multiple of the wall thickness of the cylinder liners.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

One embodiment of the invention is directed to a method and a liner in which the cylinder liners are especially easy to position and can be inserted just as easily as conventional, long cylinder liners.

A method according to the invention for the production of a cylinder crankcase having multiple cylinder liners, comprises, as steps in the method, the provision of at least two cylinder liners, each having a first, cylinder head-side end and a second, crankshaft-side end and a liner body. The method further comprises affixing the cylinder liners in a mold and casting a casting material around the cylinder liners A material strip, which projects axially at least from the second, crankshaft-side end of the cylinder liner, is affixed to each liner body.

Providing the material strip, for example, formed from a rolled metal sheet with edges abutting one another, on the cylinder liners allows the liner body of the cylinder liner to be readily designed with a shorter axial extent, compared to a conventional cylinder liner. For this purpose the cylinder liner, jointly formed from the liner body and the material strip, is, in one embodiment, approximately the same length as a conventional cylinder liner. This means that known tools, which are suitable for the use of conventional cylinder liners, can continue to be used in the method for the production of a cylinder crankcase. The relatively thin material strip is fused on in the casting process and thus, in the solidified cylinder crankcase, advantageously forms a common part with the surrounding casting material. A further advantage is that in comparison to conventional cylinder liners the shortened liner body leads to a reduction in the cost of the cylinder liner, since the liner body, owing to the thermal and mechanical demands on the cylinder running face, has to be produced from an expensive, high-grade material, while the material strip, not forming part of the cylinder running face, can be produced from a simpler material.

The cylinder liner is, in one embodiment, fixed in the mold by pushing the material strip on to a part of the mold. In one development of the method this part of the mold is a sleeve, which is of the same design shape as in the known method for conventional cylinder liners. The cylinder liner pushed on here circumferentially encloses the sleeve. Pushing the liner on greatly facilitates the locating of the cylinder liner, particularly where the overall length of the cylinder liner formed from the liner body and the material strip is equal to the overall length of a conventional cylinder liner, since this process does not differ substantially from the placing of a conventional cylinder liner. The material strip of the cylinder liner pushed on here protects that part of the mold that is not covered by the liner body from contact with the molding material and thereby increases the service life of the mold.

The axial extent of the shortened liner body is, in one embodiment, substantially equal to the length of the piston travel inside the cylinder crankcase. The cylinder liner is thus arranged in the cylinder crankcase in such a way that the liner body is substantially limited in its axial extent to the travel of the piston skirt. The cylinder liner may be located so that the cylinder head-side end face of the liner body is positioned on a level with the cylinder head gasket. The liner body, cast into the cylinder crankcase and shorter than a conventional cylinder liner, is advantageously enclosed at its crankshaft-side end face by the casting material forming the cylinder crankcase. In subsequent operation of the engine, this helps to prevent the cylinder liner becoming detached from the cylinder crankcase, since the liner body is not only circumferentially connected to the casting material, but is also supported by the casting material at its crankshaft-side end face.

In one development of the method the joint length of the liner body and the material strip of each cylinder liner is substantially equal to the length of the respective cylinder bore.

In a final machining operation after the cylinder crankcase has cooled and solidified, the material strip connected to the surrounding casting is finally, in one embodiment, removed from the cylinder bore. The final machining method used for this purpose involves honing or boring of the cylinder bore or some other machining, for example, a chip-forming method of machining the cylinder running face, such as internal turning.

In one embodiment of the method, the cylinder liners are arranged in the mold in such a way that the liner bodies are at least partially in contact with one another. Here the liner bodies are, in one embodiment, externally flattened along the contact face. Such a method permits an especially space-saving arrangement of the cylinder liners, thereby making it possible to build engines with a correspondingly greater swept volume for the same overall size. The cylinder liners are, for example, arranged so that the material strips affixed to the liner bodies are not in contact with one another. The material strips, which project from the liner bodies of the cylinder liners on the crankshaft side, thereby allow the surrounding casting material to flow smoothly around them. A cylinder liner according to one embodiment of the invention comprises a liner body with the distinguishing feature that affixed to the liner is a material strip, which axially projects from at least one end face of the liner body. Here the material strip, in one embodiment, at least partially covers the inside of the liner body. It is then particularly easy to affix the material strip to the liner body by frictional connection, e.g. by adhesive bonding, by positive interlock, e.g. by mechanical coupling, or by a combination of frictional connection and positive interlock. The material strip is, for example, affixed circumferentially to the inside of the liner body. In an alternative embodiment the material strip circumferentially encompasses the outside of the liner body.

The material strip affixed to the liner body has, in one embodiment, a cylindrical shape coaxial with the cylinder liner. The outside diameter of the cylinder formed by the material strip and the inside diameter of the cylindrical liner body are, in one embodiment, equal or aligned so that the material strip has a firm seat in the liner body. The cylindrical material strip, in one embodiment, covers a partial area of the inside of the liner and at one end face of the liner body projects in an axial direction from the liner body.

In one embodiment, the cylindrically curved material strip covers the entire internal surface of the liner body. Such an embodiment allows an especially uniform and smooth configuration of the inner surface of the cylinder liner.

In an alternative embodiment of the cylinder liner, the liner body has a recess, which is designed to accommodate the material strip. The depth of the recess is, in one embodiment, equal to the thickness of the material strip, so that a liner according to the invention has a cylindrical inner surface, which has a constant radius over the entire axial extent and as a whole has a very smooth and even design. In one embodiment, the depth of the recess and the thickness of the material strip do not exceed the thickness of the material which is removed from the inner surface of a cylinder crankcase in a final machining operation.

In one embodiment, the liner body is composed of a spray-compacted material, for example, a lightweight metal or a light alloy. It has emerged that materials from the group comprising aluminum, magnesium, aluminum-silicon alloys, aluminum-based alloys and magnesium-based alloys are particularly well suited for the liner body and that the method of spray-compacting is particularly well suited as a method for the production of liner bodies. The material strip is, in one embodiment, composed of a lightweight metal or a light alloy, the material strip in particular taking the form of an aluminum sheet. Such material strips of aluminum sheet are easy and inexpensive to produce and are well suited in terms of the material characteristics, such as the flexibility or the melting temperature, for example.

In one embodiment, the material strip is composed of a material different from that of the liner body. This advantageously allows the material used for the material strip on the one hand and the liner body on the other to be selected according to the specific requirements in each case.

In one embodiment, the material strip is composed of the same material as the casting material for the cylinder crankcase. During the casting of casting material around the cylinder liner, the material strip is then fused on, which leads to an especially good bonding of the material strip and the liner body.

The thickness of the material strip, for example, formed by a metal sheet, is suitably less than the wall thickness of the liner body. In one embodiment, the thickness of the material strip is less than 0.5 times, and preferably less than 0.25 times the wall thickness of the cylinder liner, the use of even smaller material strip thicknesses, such as 0.1 times the wall thickness of the cylinder liner body, being more preferable still, in particular between 0.05 and 0.15 times the wall thickness of the liner body. Opting for such a thin material strip ensures that the material strip can be completely removed from the cylinder bore in the final machining of a cylinder and crankcase.

A method according to the invention for the production of a short cylinder liner comprises producing a billet by spray-compacting a lightweight metal or a light alloy, extruding the billet to form a cylindrical tube, in order to form the liner body, surface machining at least a part of the internal surface of the liner body in order to prepare for the affixing of a material strip, and affixing the material strip to the inside of the liner body.

The production of a billet by spray compacting and extrusion of the billet to form a cylindrical tube involves, in one embodiment, a known method for the production of cylinder liners. The methods according to EP 0 858 517 B1, EP 0 848 760 B1 and EP 0 871 791 B1 are hereby incorporated by reference. A new feature, however, is machining the inner surface of the liner body in order to prepare it for the accommodation of a metal strip by frictional connection, by positive interlock or a combination of these. The machining of the inner surface, in one embodiment, serves to produce a regular profiling, in the form, for instance, of a thread, a flake-shaped structure, lamellar projections and/or sunken cavities or undercut depressions in the manner of a dovetail. Such profiling of the inner surface allows the material strip to be securely affixed to the liner body by pressing it into the latter, achieving a durable, mechanical coupling between the material strip and the liner body. The surface machining in one embodiment produces a recessing of the inside of the surface, so that the material strip coupled to the liner body has the same inside diameter as the liner body itself. In an alternative embodiment of the method the material strip is affixed to the inner surface of the liner body by adhesive bonding.

In an alternative embodiment, the surface machining is performed on the outer surface of the liner body, and the material strip is affixed to the outer surface of the liner body. This advantageously leads to an enlarged crankshaft-side opening of the cylinder bore adjoining the running face of the piston, which helps to increase the mobility of the connecting rod associated with the piston.

The axially running edges of the cylindrically curved material strip abut one another in one embodiment, so that they form a closed seam and the cylindrically curved material strip overall has a closed circumferential face.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail below with reference to preferred exemplary embodiments of the invention and with reference to the drawings attached.

DETAILED DESCRIPTION OF THE INVENTION

Figure 1:
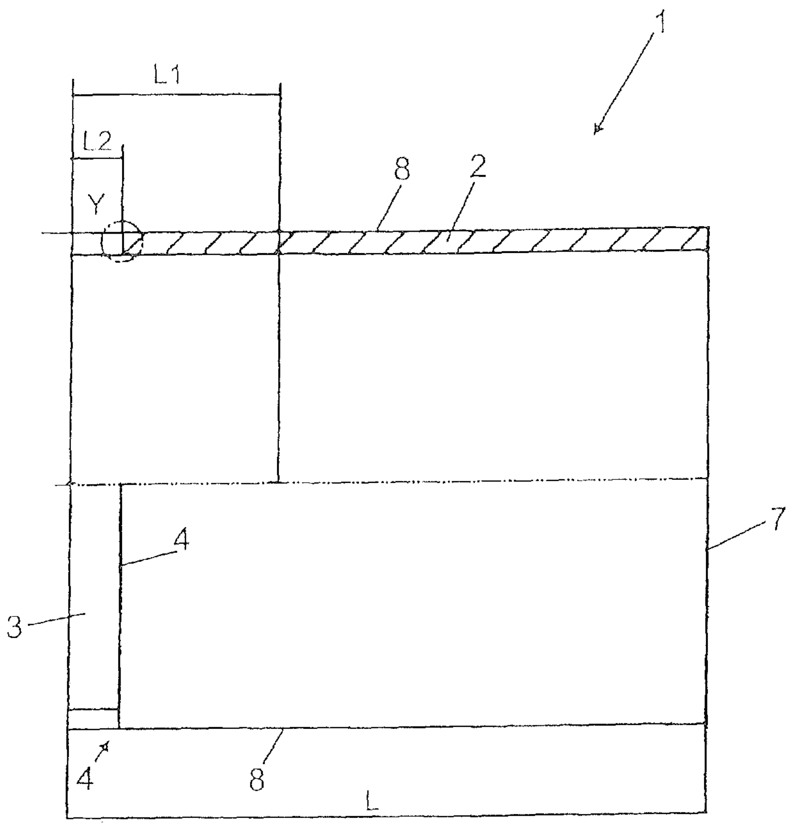
FIG. 1 shows a longitudinal section through a first embodiment of a cylinder liner according to the invention.

The cylinder liner 1 represented in FIG. 1 comprises a cylindrical liner body 2 and a material strip 3 affixed to the internal surface of the liner body 2. The material strip 3 has an overall axial extent denoted by L1 and projects by the distance L2 from the crankshaft-side end face 4 of the liner body 2. The overall axial extent of the cylinder liner 1 is denoted by L. In the exemplary embodiments shown in FIGS. 1 and 2 the axial extent L1 of the material strip 3 is less than the axial extent of the liner body 2. In an alternative development, however, the axial extent L1 of the material strip 3 may also be equal to or greater than the axial extent of the liner body 2, particularly if the material strip 3 extends as far as the cylinder head-side end face 7 of the liner body 2.

Figure 2:
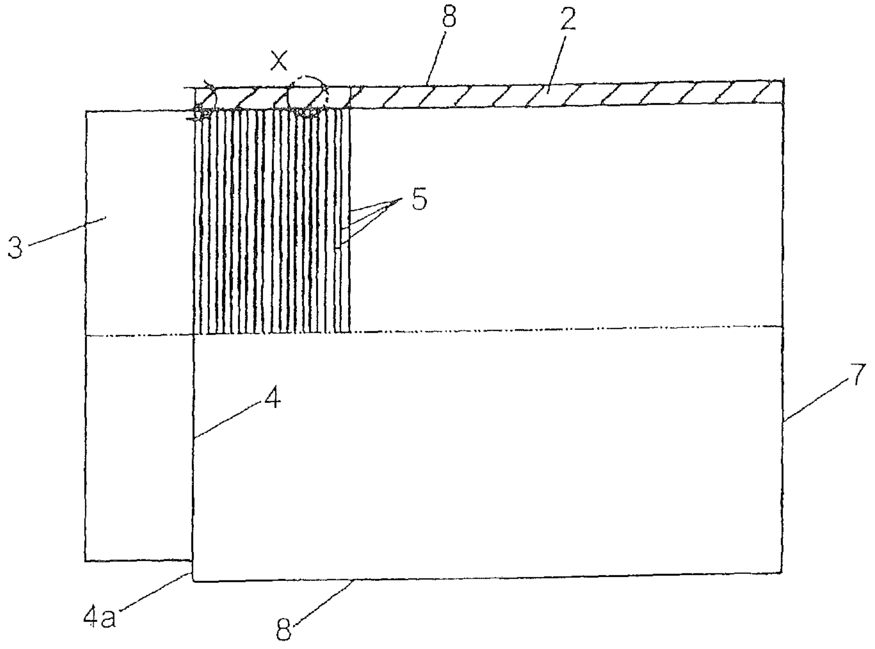
FIG. 2 shows a longitudinal section through a second embodiment of a cylinder liner according to the invention.
Figure 3:
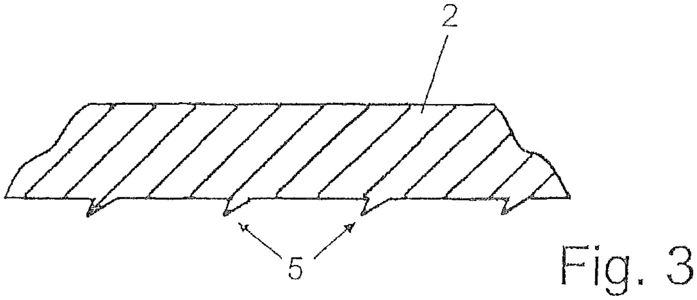
FIG. 3 schematically shows a detailed view of the detail denoted by X of the cylinder liner represented in FIG. 2.

The coupling between the liner body 2 and the material strip 3 can be seen particularly well from FIGS. 2 and 3. The inside of the liner body 2 shows a shark's fin-shaped profiling 5, according to one embodiment, which owing to its undercuts forms a very good coupling with the material strip 3 pressed into the liner body. In one embodiment, the profiling is rotationally symmetrical over the entire internal surface covered by the material strip.

In an alternative embodiment, not shown, the profiled area is not formed over the entire internal surface covered by the material strip, but only over rotationally symmetrical partial areas. The rotationally symmetrical partial areas are here interrupted in an axial direction by areas in which no special profiling is provided. Instead of the shark's fin-shaped profiling shown, in alternative embodiments other profile shapes are also provided, with and without undercuts, such as a saw tooth profile or a dovetail-shaped profile, for example.

In a further, alternative embodiment (not shown), the material strip is affixed to the inside of the cylinder liner by a frictional connection, for example by adhesive bonding. In this embodiment a profile-forming machining of the surface of the liner body is not necessary.

Figure 6:
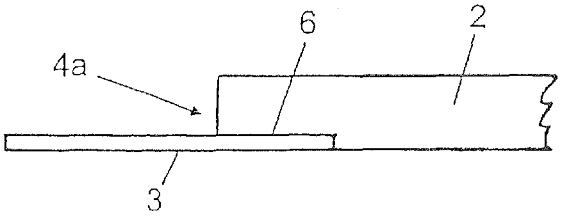
FIG. 6 shows a further alternative embodiment of the detailed view of a cylinder liner according to the invention shown in FIG. 4.
Figure 7:
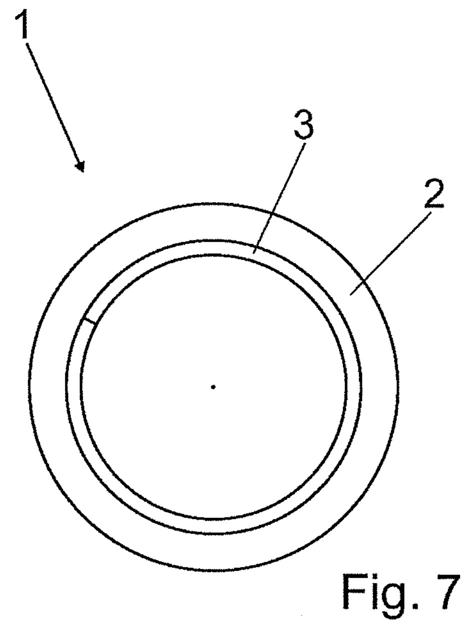
FIG. 7 shows an axial section through an embodiment of a cylinder liner represented in FIG. 1.

In another embodiment, instead of a profiling, the liner body 2 shown in FIG. 6 has a recess 6 for accommodating the material strip 3. The inward-facing surface of the material strip 3 and the inward-facing surface of the liner body 2 thus form a common, plane face. As can easily be seen in this embodiment, the thickness of the material strip 3 is significantly less than the wall thickness of the liner body 2.

In order to produce a cylinder crankcase, the cylinder liner 1 is pushed onto a part of a mold with the material strip 3 projecting from the crankshaft-side end face 4, so that the part of the mold is enclosed by the cylinder liner 1. The cylinder liner 1 has liquid casting material cast around it, so that at least a part of the outer circumferential surface 8 of the liner body 2 is in contact with the casting material. In order to improve the bonding of the liner body 2 to the casting material, a profiling or a surface coating improving the bonding to the casting material can be provided on the outer circumferential surface 8.

Figure 4:
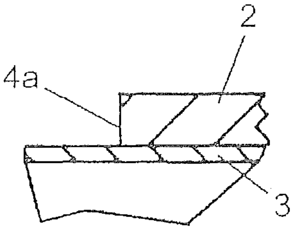
FIG. 4 schematically shows a detailed view of the detail denoted by Y of the cylinder liner represented in FIG. 1.
Figure 5:
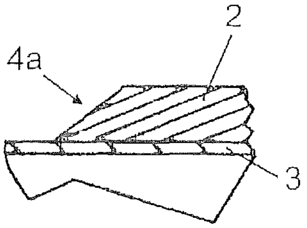
FIG. 5 shows an alternative embodiment of the detail shown in FIG. 4.

As can readily be seen from FIGS. 4 and 6 in particular, the end face 4*a* of the liner body 2 is substantially perpendicular to the axially extending external surface of the material strip 3. In an alternative embodiment the end face 4*a* is at an acute angle to the material strip 3, as can readily be seen, in particular, from FIG. 5. This embodiment is advantageous particularly when, in casting the cylinder liner 1 into a cylinder crankcase, the casting material gets into the mold from the crankshaft-side end face 4. The casting material is then directed by the end face 4*a*, standing at an acute angle, towards the cylinder head-side end face 7 of the cylinder liner 1, less turbulence being generated in the liquid casting material compared to the embodiment shown in FIG. 4, thereby improving the bonding of the cylinder liner 1 to the cylinder crankcase.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that layers and/or elements depicted herein are illustrated with particular dimensions relative to one another (e.g., layer to layer dimensions and/or orientations) for purposes of simplicity and ease of understanding, and that actual dimensions of the elements may differ substantially from that illustrated herein.

The invention claimed is:

1. A cylinder liner for use in a cylinder crankcase, comprising:

a liner body having at least one end face, an inner surface, and a piston travel region, wherein the liner body is configured to contact a piston within the piston travel region;

a material strip having a cylindrical outer surface;

wherein the cylindrical outer surface of the material strip is directly affixed to the inner surface of the liner body external to the piston travel region; and wherein the material strip projects axially from the at least one end face of the liner body.

2. The cylinder liner as claimed in claim 1, wherein the material strip comprises a sheet having two opposing edges abutting one another, therein forming a cylinder.

3. The cylinder liner as claimed in claim 1, wherein the material strip is affixed to an inside of the liner body by a frictional connection.

4. The cylinder liner as claimed in claim 1, wherein the liner body and the material strip are made from two different materials selected from the group comprising a lightweight metal and a lightweight metal alloy, and wherein an axial extent of the material strip is less than an axial extent of the liner body.

5. The cylinder liner as claimed in claim 1, wherein the liner body and the material strip are made from different materials selected from the group comprising a lightweight metal and a lightweight metal alloy, wherein the material strip has a thickness being smaller than a thickness of the liner body.

6. A cylinder liner for use in a cylinder crankcase, comprising:

a liner body having at least one end face, an inner surface, and a piston travel region, wherein the liner body is configured to contact a piston within the piston travel region;

a cyclindrical material strip, wherein an inward-facing surface of the material strip and an inward-facing surface of the liner body have a common diameter, and wherein an axial extent of the inward-facing surface of the liner body exceeds an axial extent of the inward-facing surface of the material strip;

wherein the material strip is directly affixed to the inner surface of the liner body external to the piston travel region; and wherein the material strip projects axially from the at least one end face of the liner body.

7. The cylinder liner as claimed in claim 6, wherein the material strip at least partially covers an inside of the liner body.

8. The cylinder liner as claimed in claim 6, wherein the liner body is made from a spray-compacted material.

9. The cylinder liner as claimed in claim 6, wherein the liner body is made from a material selected from the group comprising a lightweight metal and a light weight metal alloy.

10. The cylinder liner as claimed in claim 6, wherein the material strip is made from a material selected from the group comprising a lightweight metal and a light weight metal alloy.

11. The cylinder liner as claimed in claim 6, wherein the material strip has a strip thickness, wherein the liner body has a wall thickness, and wherein the strip thickness of the material strip is less than the wall thickness of the liner body.

12. The cylinder liner as claimed in claim 11, wherein the strip thickness of the material strip is less than half the wall thickness of the liner body.

13. The cylinder liner as claimed in claim 6, wherein the material strip and the liner body each have a respective axial extent, and wherein the axial extent of the material strip is less than the axial extent of the liner body.

14. A cylinder liner for a cylinder crankcase, the cylinder liner comprising:

a liner body having at least one end face, an inner surface, and a piston travel region, wherein the liner body is configured to contact a piston within the piston travel region; and a cyclindrical material strip, wherein an entirety of an outer circumference of the material strip is frictionally coupled to the inner surface of the liner body external to the piston travel region, and wherein the material strip projects axially from the at least one end face of the liner body.

15. The cylinder liner as claimed in claim 14, wherein a recess is provided on the liner body to accommodate the material strip.

16. The cylinder liner as claimed in claim 14, wherein the material strip is made of a material different from a material of the liner body.

17. The cylinder liner as claimed in claim 14, wherein the liner body has a substantially cylindrical inner bore having an inner circumference along a length thereof configured to guide the piston along the piston travel surface.

18. A cylinder liner for a cylinder crankcase, the cylinder liner comprising:

a liner body having at least one end face, an inner surface, and a piston travel region, wherein the liner body is configured to contact a piston only within the piston travel region;

a cyclindrical material strip, wherein the material strip is directly affixed to the inner surface of the liner body external to the piston travel region, wherein the material strip projects axially from the at least one end face of the liner body, therein substantially prolonging the liner body, wherein the liner body is made from a spray-compacted aluminum-based alloy, and wherein the material strip is made of a thin sheet different from said aluminum-based alloy.

19. The cylinder liner as claimed in claim 18, wherein the material strip is affixed to an inside of the liner body by a mechanical coupling.

20. The cylinder liner as claimed in claim 18, wherein the material strip projecting axially over one end face of the liner body partially covers an inside area of the liner body, and wherein the piston travel surface of the liner body is axially displaced from said inside area.

* * * * *